United States Patent [19]
Salazar et al.

[11] 3,991,377
[45] Nov. 9, 1976

[54] DIFFERENTIAL PHASE SHIFT KEYING DEMODULATOR

[75] Inventors: Andres Clarence Salazar, Middletown; Jean-Jacques Werner, Fair Haven, both of N.J.

[73] Assignee: Bell Telephone Laboratories, Incorporated, Murray Hill, N.J.

[22] Filed: Dec. 2, 1975

[21] Appl. No.: 637,074

[52] U.S. Cl. .............................. 329/105; 325/320; 329/104; 329/124
[51] Int. Cl.² .......................................... H03K 9/04
[58] Field of Search ........... 329/104, 105, 124, 125; 331/12; 325/320

[56] References Cited
UNITED STATES PATENTS

| | | |
|---|---|---|
| 3,568,067 | 3/1971 | Williford ............................ 329/124 |
| 3,588,720 | 6/1971 | Fluhr .................................. 329/124 |
| 3,761,829 | 9/1973 | Spaulding ........................... 329/104 |
| 3,921,075 | 11/1975 | Denny................................ 329/104 |

OTHER PUBLICATIONS
Principles of Data Communication, R. W. Lucky 1968, pp. 255–259.

Primary Examiner—John Kominski
Attorney, Agent, or Firm—Robert O. Nimtz

[57] ABSTRACT

Disclosed is a Differential Phase Shift Keying demodulator employing a Hilbert filter. Filtered and unfiltered signals are sampled at the symbol rate of an incoming signal, and the sampled signals are each applied to a delay element having a one-symbol period delay. The delayed and the undelayed replicas of the two sampled signals are linearly combined to form the demodulator's output signals.

6 Claims, 1 Drawing Figure

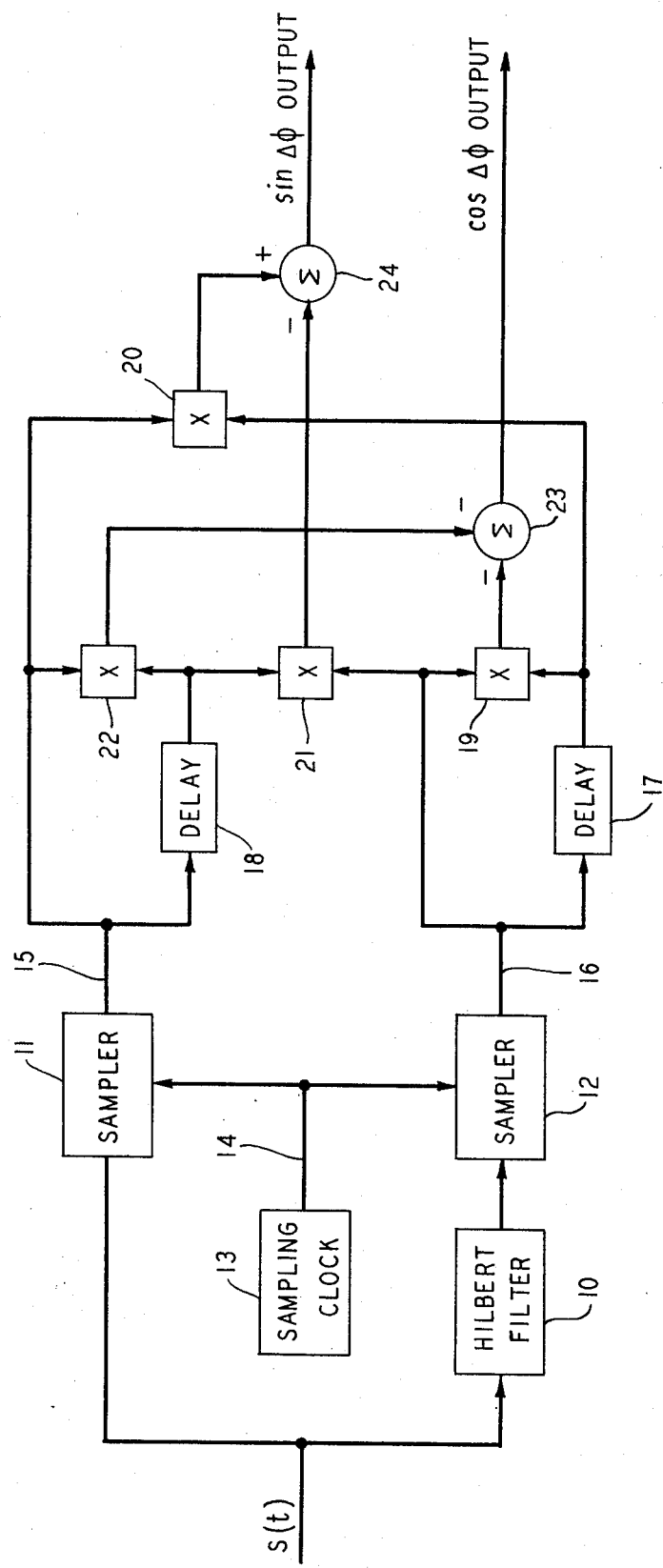

3,991,377

DIFFERENTIAL PHASE SHIFT KEYING DEMODULATOR

BACKGROUND OF THE INVENTION

This relates to data communications apparatus and, more particularly, to apparatus for demodulating Differential Phase Shift Keying (DPSK) modulated signals.

Data transmission over voice frequency communication channels is generally accomplished via data sets which employ modulation and demodulation processes. More specifically, binary digits which are to be transmitted are initially converted to symbol signals (e.g., two bits per symbol). The symbol signals are then appropriately modulated with a carrier signal and the modulated signals are sent over the communication channel. At a receiving data set, the modulated signals are appropriately demodulated to recover the binary digits.

One well-known modulation approach, for example, is Pulse Amplitude Modulation (PAM). In a PAM signal $$s(t) = a(t)\cos \omega_c t, \qquad (1)$$

the term $a(t)$ which defines the amplitude of the carrier contains the symbol information. Demodulation of the PAM signal of Equation (1) can be accomplished simply by multiplying the signal $s(t)$ by a demodulating carrier having a radian frequency $\omega_c$ and by applying the multiplied signal to a low-pass filter.

For coherent demodulation of amplitude modulated signals, D. A. Spaulding in U.S. Pat. No. 3,761,829, issued Sept. 25, 1973, describes the use of a Hilbert transform filter followed by sampling at the symbol rate and further followed by analog-to-digital conversion and digital multiplication by appropriate carrier signals. The Spaulding circuit, however, is only effective for amplitude modulation.

Another well-known modulation approach is Differential Phase Shift Keying modulation (DPSK). In a DPSK signal $$s(t) = \sum_n g(t - nT) \cos (\omega_c t + \phi_n), \qquad (2)$$

the term $g(t)$ is a Nyquist pulse, $T$ is the symbol period (baud period), $\omega_c$ is the transmitted signal's carrier frequency and $\phi_n$ is the phase angle which represents the symbol information (via the differential angle $\Delta\phi_n = \phi_n - \phi_{n-1}$).

A situation of particular interest presents itself when only four symbols are to be transmitted and where, therefore, only four phase angles are necessary for DPSK modulation. Advantageously, the phase angles employed are $\pm \pi/4, \pm 3\pi/4$. In *Principles of Communication*, by R. W. Lucky et al, McGraw-Hill 1968, FIG. 9.7 on page 257 depicts a four-phase DPSK demodulation circuit (called a comparison detector) employing the above phase angles. The described circuit comprises a front-end band limiting filter branching to four signal paths, a 90° phase shifter (a Hilbert filter) followed by a delay of length T in one path, a delay of length T in another path, means for appropriate multiplication, and means for post detection filtering. Mathematically, the operations performed by the comparison detector are LPF $\{s(t)s(t+T)\}$ for developing one output and LPF $\{s(t) \cdot \hat{H}[s(t+T)]\}$ for developing a second output, where H designates Hilbert filtering and LPF designates low-pass filtering. Because of the multiplications involved, the comparison demodulator of FIG. 9.7 doubles the input signals' bandwidths and consequently fails by causing interfering spectral overlap when the transmitted baseband signal has a wide bandwidth compared to the carrier frequency. This interference cannot be effectively eliminated by post-multiplication filtering. In fact, the interference is increased in a digital implementation of the FIG. 9.7 circuit through the phenomenon of aliasing if the processing clock in the digitally implemented circuit is not high enough.

SUMMARY OF THE INVENTION

It is an object of this invention, therefore, to provide a DPSK demodulator which does not encounter spectral overlap and aliasing problems.

It is another object of this invention to provide a DPSK demodulator which does its processing digitally.

It is a further object of this invention to provide a demodulator which digitally processes the majority of operations at the baud, or symbol rate.

It is a still further object of this invention to provide a DPSK demodulator which performs all of the required digital processing at the baud rate.

These and other objects of the invention are achieved by a DPSK demodulator employing a Hilbert filter that is responsive to the applied signal to be demodulated. The filtered and the unfiltered signals are sampled at the baud rate of the incoming signal, and the sampled signals are each applied to a delay element having a baud period delay. The delayed and the undelayed replicas of the two sampled signals are linearly, e.g., multiplicably and arithmetically, combined to form the demodulator's output signals.

BRIEF DESCRIPTION OF THE DRAWING

The above and other objects and advantages of this invention will be more fully appreciated from a consideration of the following description and the appended drawing in which the single FIGURE is a block diagram of a DPSK demodulator employing the principles of this invention.

DETAILED DESCRIPTION

A DPSK signal can be represented by $$s(t) = \sum_n g(t - T) \cos (\omega_c t + \phi_n) \qquad (3)$$

where $\omega_c$ is the radian carrier frequency, $1/T$ is the baud rate, $$\phi_n - \phi_{n-1} = \Delta\phi_n$$

is the symbol to be transmitted and $g(t)$ is a Nyquist pulse. A Nyquist pulse is a signal having the property $g(t)=0$ for all $t=nT$ ($n \neq 0$), $g(O)=1$ and $g(t) < 1$ otherwise. For convenience of the following analysis, the analytical signal $z(t)$ shall be used. By definition, $$z(t) = s(t) + j\hat{s}(t) \qquad (4)$$

where $\hat{s}(t)$ is the Hilbert transform of $s(t)$. Combining equations (3) and (4), it can be shown that $$z(t) = \sum_a A_n g(t-nT) e^{j\omega_c t} \tag{5}$$

where $$A_n = e^{j\phi_n}.$$

Multiplying $A_n$ by the complex conjugate of $A_{n-1}$ ($A^*_{n-1}$) results in $$A_n A_{n-1}^* = e^{j\phi_n - \phi_{n-1}} = e^{j\Delta\phi} = \cos \Delta\phi_n + j \sin \Delta\phi_n. \tag{6}$$

If $\Delta\phi_n$ assumes only the values $0 \pm \pi/4, \pm 3\pi/4$, then $A_n A^*_{n-1}$ can only assume the values of $\sqrt{2}/2 \pm j\sqrt{2}/2$ and $-\sqrt{2}/2 \pm j\sqrt{2}/2$, respectively. The term $A_n A^*_{n-1}$ uniquely and simply provides an indication of the transmitted differential angle $\Delta\phi_n$. Therefore, a DPSK demodulator can be realized if the term $A_n A^*_{n-1}$ is computed and the real and imaginary parts of $A_n A^*_{n-1}$ are separately provided at the output. The sign and the magnitude of the signals at the two outputs would indicate which differential phase angle was transmitted.

To develop a representation of the term $A_n A^*_{n-1}$ in accordance with the principles of this invention, the signal $z(t)$ is sampled at a rate $1/T$ (the baud rate) and is multiplied by the sampled conjugate of $z(t-T)$, i.e., $z(t-T)$. Thus, $$z(nT) z^*(nT-T) = \sum_m \sum_k A_m A_k^* g(nT-mT) g(nT-T-kT) e^{j\omega_c T} \tag{7}$$

One of the properties of the Nyquist pulse $g(t)$ is that $g(t)=1$ at $t=0$, $g(t)=0$ at $t=nT$ for $n=1,2,3 \ldots$, and $g(t)$ 0 elsewhere. In view of the properties of $g(t)$, it can be observed that the signal $g(nT-mT)$ of equation (7) is zero except where $m=n$; and that the signal $g(nT-T-kT)$ is zero except when $k=n-1$. Simplifying equation (7) in view of the above, results in $$z(nT) z^*(nT-T) = A_n A^*_{n-1} e^{j\omega_c T}. \tag{8}$$

For particular combinations of carrier frequency $\omega_c$ and of baud rate $1/T$, equation (8) may be simplified. Thus, for example, the Bell System 201C Data Set operates at $\omega_c = 2\pi \cdot 1800$ and $T = 1/1200$. In this situation, the exponent's argument $\omega_c T$ is equal to $3\pi$ which is also equal to $-1$, and therefore applying the $A_n A^*_{n-1}$ equivalency of equation (6), $$z(nT)z^*(nT-T) = -\cos \Delta\phi_n - j \sin \Delta\phi_n \tag{9}$$

which, like the signal of equation (6), uniquely and simply provides an indication of the transmitted differential angle $\Delta\phi_n$. Accordingly, in order to realize a DPSK demodulator in accordance with the principles of this invention, it is necessary to develop the product signal $z(nT)z(nT-T)$.

For easy determination of the product signal of equation (9), it is convenient to develop equation (9) in cartesian coordinates. Appropriately expanding $z(nT)z^*(nT-T)$ yields $$z(nT)z^*(nT-T) = [s(nT)s(nT-T)+\hat{s}(nT)\hat{s}(nT-T)]+j[\hat{s}(nT)s(nT-T) -s(nT)\hat{s}(nT-T)]. \tag{10}$$

From equation (10) it can be seen that a Hilbert filter, two single baud delay elements, and a number of multipliers and adders are all that are necessary for evaulating the various elements of the signal in equation (10). A DPSK demodulator structure embodying equation (10) is shown in the appended FIGURE.

In the FIGURE, an applied DPSK modulated signal $s(t)$ is applied to a Hilbert filter 10 and to a sampler 11. Filter 10 generates the Hilbert transform $\hat{s}(t)$ of the signal $s(t)$ and applies the transformed signal to a sampler 12. Both samplers 11 and 12 are responsive to a sampling clock 13 which provides sampling pulses on lead 14. The sampling pulses occur at intervals of $T$ seconds. Sampler 12 gates, at appropriate times, the output of filter 10 onto lead 16, thereby developing the signal $\hat{s}(nT)$. Sampler 11 similarly gates the signal $s(t)$ onto lead 15, thereby developing the signal $s(nT)$. Sampler 11 also provides a delay to compensate for any unwanted delay that may result from a practical implementation of filter 10. With the filter 10 implementation described infra, sampler 11 requires no compensating delay.

The signal on lead 16 is connected to a delay element 17 having a delay of $T$ seconds, and the signal on lead 15 is applied to a delay element 18 which also provides a delay of $T$ seconds. The output signal of delay element 17 is applied to multipliers 19 and 20, and the output signal of delay element 18 is applied to multipliers 21 and 22. Also, the signal on lead 16 is applied to multipliers 19 and 21, and the signal on lead 15 is applied to multipliers 22 and 20. Thus, multiplier 19 develops the signal $\hat{s}(nT)\hat{s}(nT-T)$, multiplier 20 develops the signal $s(nT)\hat{s}(nT-T)$, multiplier 21 develops the signal $\hat{s}(nT)s(nT-T)$, and multiplier 22 develops the signal $s(nT)s(nT-T)$.

The output signal of multiplier 19 is applied to one input of a negative adder 23, and the output signal of multiplier 22 is applied to another input of negative adder 23. Negative adder 23 is a conventional adder followed by an amplifier having a gain of minus one. The output signal of negative adder 23 is the negative sum of its input signals. Thus, the output signal of negative adder 23 develops the signal $\cos \Delta\phi_n$ of equation (9). The output signal of multiplier 21 is connected to a negative input of a subtractor 24, and the output signal of multiplier 20 is connected to a positive input of subtractor 24. Thus, the output signal of subtractor 24 develops the signal $\sin \Delta\phi_n$ of equation (9).

For some Hilbert filter design techniques, reference is made to *Theory and Application of Digital Signal Processing* by L. R. Rabiner et al, Prentice Hall, 1975, pp. 71–72 and 168–177; "Two Design Techniques for Digital Phase Networks," A. Salazar et al, *Bell System Technical Journal*, Vol. 54, No. 4, April 1975; and U.S. Pat. No. 3,484,556 (FIG. 2A therein) issued to J. L. Flanagan et al on Dec. 16, 1969. With respect to the structure of the signal delay, multipliers, and adders of FIG. 1, reference is made to *The Logic of Computer Arithmetic*, by I. Flores, Prentice Hall, Inc., 1963.

In accordance with the principles of this invention, as described above, the embodiment of the single FIGURE accepts an incoming DPSK modulated signal $s(t)$, filters the signal in Hilbert filter 10 and samples the filtered signal and the unfiltered incoming signal. The sampled signals are applied to delay elements and to a combining network for implementing equation (10), resulting in the real and imaginary output signals defined by equation (9). As stated previously, these output signals uniquely define (by their sign and amplitude) the differential phase angle contained in signal $s(t)$.

What is claimed is:

1. A demodulator responsive to an applied input signal comprising:
   a Hilbert filter responsive to said applied input signal;
   first means for sampling said applied input signal at a preselected sampling frequency;
   second means for sampling the output signal of said Hilbert filter at said preselected sampling frequency;
   third means for delaying the output signal of said first means for a one period duration of said preselected sampling frequency;
   fourth means for delaying the output signal of said second means for a one period duration of said preselected sampling frequency;
   fifth means for multiplying the output signal of said first means with the output signal of said third means;
   sixth means for multiplying the output signal of said third means with the output signal of said second means;
   seventh means for multiplying the output signal of said first means with the output signal of said fourth means;
   eighth means for multiplying the output signal of said second means with the output signal of said fourth means;
   ninth means for arithmetically combining the output signals of said sixth and said seventh means; and
   tenth means for arithmetically combining the output signals of said fifth and said eighth means.

2. A demodulator responsive to samples of an applied sampled signal $s(t)$ comprising:
   a Hilbert transform filter responsive to said signal $s(t)$;
   a first gate for selecting every $N^{th}$ sample of said signal $s(t)$ where N is a preselected integer;
   a second gate for selecting every $N^{th}$ sample of the output signal of said Hilbert transform filter where N is said preselected integer;
   a first delay element for providing a one sample delay of the output signal of said first gate;
   a second delay element for providing a one sample delay of the output signal of said second gate;
   a first multiplier for developing a product of the output signal of said first gate with the output signal of said first delay element;
   a second multiplier for developing a product signal of the output signal of said first gate with the output signal of said second delay element;
   a third multiplier for developing a product signal of the output signal of said second gate with the output signal of said first delay element;
   a fourth multiplier for developing a product signal of the output signal of said second gate with the output signal of said second delay element; and
   means for arithmetically combining the output signals of said first, second, third, and fourth multipliers to develop output signals of said demodulator.

3. The demodulator of claim 2 wherein said means for arithmetically combining comprises:
   means for adding the output signals of said first and fourth multipliers to develop a first output signal; and
   means for subtracting the output signal of said third multiplier from the output signal of said second multiplier to develop a second output signal.

4. A demodulator responsive to a signal $s(t)$ which conveys symbol information at a predetermined symbol rate T comprising:
   a Hilbert filter for developing a Hilbert transform signal $\hat{s}(t)$ of said signal $s(t)$;
   first means for sampling the signal $s(t)$ at said symbol rate to develop a signal $s(nT)$;
   second means for sampling the signal $\hat{s}(t)$ at said symbol rate to develop a signal $\hat{s}(nT)$;
   third means responsive to said signal $s(nT)$ for developing a delayed replica signal $s(nT-T)$;
   fourth means responsive to said signal $\hat{s}(nT)$ for developing a delayed replica signal $\hat{s}(nT-T)$;
   fifth means responsive to said first, second, third and fourth means output signals for developing a combined signal $s(nT)s(nT-T) + \hat{s}(nT)\hat{s}(nT-T)$; and
   sixth means responsive to said first, second, third and fourth means output signals for developing a combined signal $\hat{s}(nT)s(nT-T) + s(nT)\hat{s}(nT-T)$.

5. A demodulator for differential phase shift keying input signals comprising:
   a Hilbert filter responsive to said signals for generating an output signal that is sampled at a predetermined rate;
   means for sampling said input signals;
   means for generating a delayed version of said sampled input signals and a delayed version of the output signals of said Hilbert filter;
   means for generating the four cross products of said delayed and undelayed versions of said filtered signals and said sampled input signals; and
   means for selectively combining said four cross products.

6. In a Differential Phase Shift Keying demodulator employing a Hilbert filter connected to an applied input signal and followed by a delay element, and further employing said input signal and a delayed replica thereof, the improvement comprising:
   means for generating the four cross products of said delayed and undelayed replicas of said input signal and of the output signal of said Hilbert filter, and
   means for arithmetically combining selected pairs of said cross products.

* * * * *

UNITED STATES PATENT AND TRADEMARK OFFICE
CERTIFICATE OF CORRECTION

PATENT NO. : 3,991,377
DATED : November 9, 1976
INVENTOR(S) : Andres C. Salazar and Jean-Jacques Werner It is certified that error appears in the above-identified patent and that said Letters Patent are hereby corrected as shown below:

Column 2, line 51, that portion of the formula reading "g(t-T)" should read --g(t-nT)--. Column 3, line 1, that portion of the formula reading "$\Sigma_a$" should read --$\Sigma_n$--. Column 3, line 13, equation (6) should read $$--A_n A^*_{n-1} = e^{j(\phi_n - \phi_{n-1})} = e^{j\Delta\phi_n} = \cos \Delta\phi_n + j \sin \Delta\phi_n. \quad (6)--.$$

Column 3, line 29, that portion of the formula reading "z(t-T)" should read --z*(t-T)--. Column 3, line 37, that portion of the formula reading "g(t)  0" should read --g(t)≠0--.

Column 3, line 43, that portion of the formula reading "$e^{j\omega_e T}$" should read --$e^{j\omega_c T}$--. Column 3, line 60, that portion of the formula reading "z(nT)z(nT-T) should read --z(nT)z*(nT-T)--.

Signed and Sealed this

First Day of February 1977

[SEAL]

Attest:

RUTH C. MASON
Attesting Officer

C. MARSHALL DANN
Commissioner of Patents and Trademarks